(12) United States Patent
Auboussier et al.

(10) Patent No.: US 8,186,590 B2
(45) Date of Patent: May 29, 2012

(54) HIGH SPEED PERSONALIZATION MACHINE

(75) Inventors: Eric Auboussier, Saint Jean de Braye (FR); Benoît Berthe, Orleans (FR); Yannick Suzanne, Chateauneuf sur Loire (FR)

(73) Assignee: DataCard Corporation, Minnetonka, MN (US)

( * ) Notice: Subject to any disclaimer, the term of this patent is extended or adjusted under 35 U.S.C. 154(b) by 480 days.

(21) Appl. No.: 11/992,208

(22) PCT Filed: Sep. 15, 2006

(86) PCT No.: PCT/IB2006/002546
§ 371 (c)(1),
(2), (4) Date: Jun. 25, 2009

(87) PCT Pub. No.: WO2007/031856
PCT Pub. Date: Mar. 22, 2007

(65) Prior Publication Data
US 2010/0006650 A1    Jan. 14, 2010

(30) Foreign Application Priority Data

Sep. 15, 2005 (FR) ................................... 05 09430
Oct. 19, 2005 (FR) ................................... 05 10634

(51) Int. Cl.
*G06K 7/00* (2006.01)
(52) U.S. Cl. ........................ 235/439; 235/486
(58) Field of Classification Search ............... 235/439, 235/486
See application file for complete search history.

(56) References Cited

U.S. PATENT DOCUMENTS 5,602,624 A * 2/1997 Coburn et al. .................... 347/2
2005/0017069 A1 * 1/2005 Marta ............................ 235/380

FOREIGN PATENT DOCUMENTS

| EP | 0706150 | 4/1995 |
| EP | 0797167 | 9/1997 |
| EP | 0984389 | 3/2000 |
| EP | 1217575 | 6/2002 |

* cited by examiner

*Primary Examiner* — Daniel Hess
(74) *Attorney, Agent, or Firm* — Hamre, Schumann, Mueller & Larson, P.C.

(57) ABSTRACT

The present invention concerns a high speed machine for personalizing portable objects, incorporating an integrated circuit comprising at least one memory, the machine comprising a transfer device (3) for the portable objects to be personalized and a compact rotating drum (20) containing a plurality of interface electronic circuits, called couplers, each of these couplers being connected to at least one personalization station (22*i*) comprising at least one linking device with the integrated circuit of a portable object, characterized firstly in that each of these couplers is removably mounted so that it can be adapted to the type of programming used for the personalization data, and secondly in that the personalization stations (22*i*) are also removable for their adaptation to the type of portable objects (4) to be personalized and/or to the couplers used, the rotating drum (20) comprising grooved sections containing a plurality of grooves for latching of the personalization stations (22*i*).

25 Claims, 7 Drawing Sheets

HIGH SPEED PERSONALIZATION MACHINE

RELATED APPLICATIONS

Figure 1:
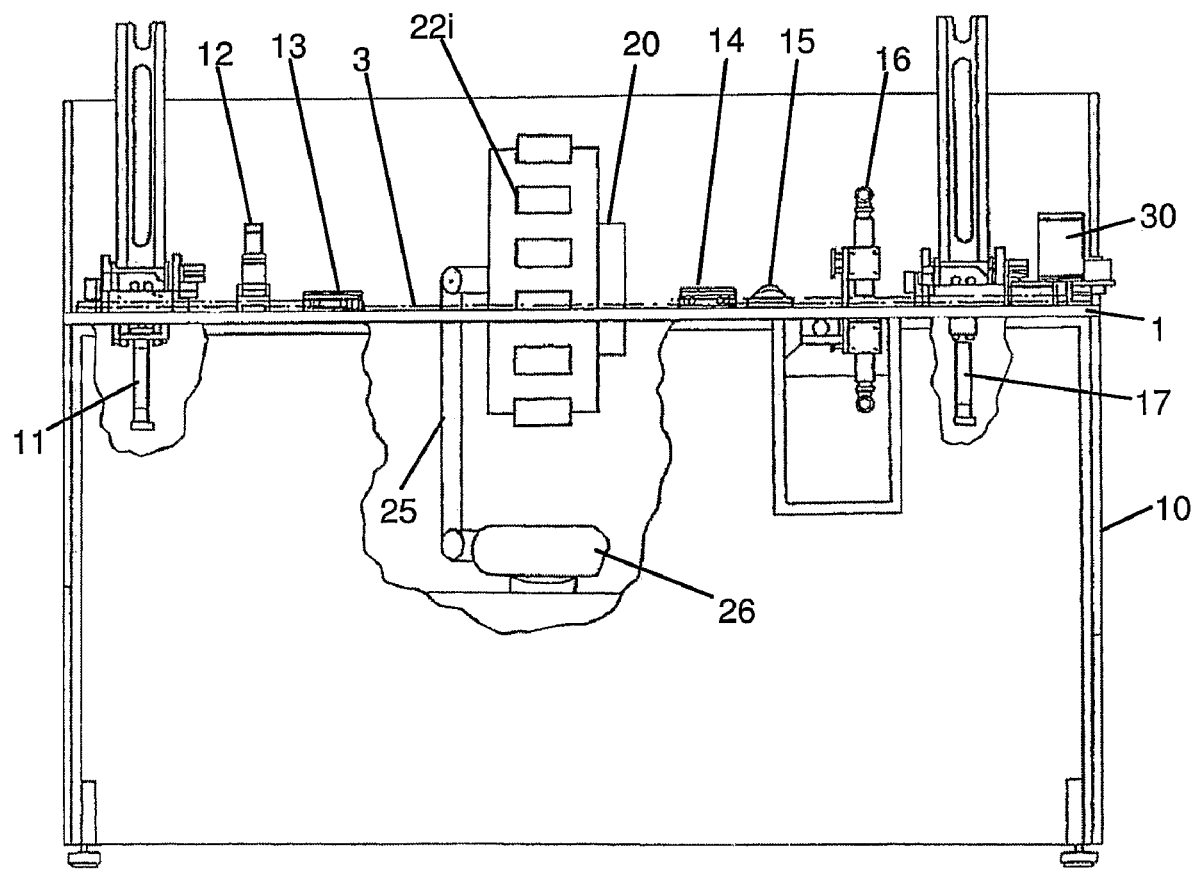

The present application is based on, and claims priority from, PCT Application Number PCT/IB06/002546, filed Sep. 15, 2006; FR Application No. 0510634, filed Oct. 19, 2005; and FR Application No. 0509430, filed Sep. 15, 2005, the disclosures of which are hereby incorporated by reference herein in their entireties.

The present invention relates to the area of personalization machines for portable objects such as chip cards for example comprising a memory, and in particular so-called <<intelligent>> chip cards i.e. incorporating a microprocessor. The invention concerns a high speed personalization machine for portable objects such as chip cards, but also various types of portable objects comprising at least one data storage memory and optionally a microprocessor.

One first problem in this area concerns the speed of personalizing chip cards. The recording of data in the memory of chip cards in the progress of being personalized may be too time-consuming to ensure satisfactory production rates. It would therefore be of interest to provide a machine enabling several cards to be personalized at the same time in order to improve production rates.

A second problem in this area concerns the recording of data in chip cards by contactless link. Some chip cards have a chip accessible via a contact link, but chips also exist which can be accessed without any contact, i.e. via an antenna incorporated in the card. Some chip cards are therefore called <<contactless>>, others are called <<contact>> cards and others are said to be <<mixed>> since they integrate the two types of possible link. It would therefore be of interest to provide a machine which allows the personalization of <<contactless>>, <<contact>> and <<mixed>> cards.

A third problem in this area is related to the two first, and concerns the incompatibility existing between the presence of the antennae required for personalizing <<contactless>> cards and the multiplication of personalizing stations needed for high speed personalizing machines. Congestion is also a problem related to this incompatibility and it is difficult to reconcile the multiplicity of personalization stations with the compactness of a personalization machine without risking interferences between the personalization antennae of <<contactless>> cards. Yet it would be of interest to provide a personalization machine which does not take up too much space and whose compactness allows the multiplication of the number of stations enabling cards to be personalized at the same time, while avoiding interferences between the antennae of the stations.

Finally, a fourth problem concerns the existence of different types of programming used by the different developers of chip cards, called integrators, and the different integrated circuits forming the interface needed for this card personalization. The different integrators have specific cards and programming algorithms, and it is difficult to reconcile these in one same personalization machine.

Various types of high speed personalizing machines are known in the prior art, some enabling the personalization of contact or contactless cards, such as European patent EP 0 984 389 granted to the applicant of the present invention. However, prior art machines do not allow card personalization to be adapted both in relation to the type of link used in the cards, whether with or without contact, and to the solutions chosen by the integrators. In addition, these machines have the disadvantage of only allowing the personalization of a limited number of cards at the same time on account of congestion and radiation due to the antennae of the machines communicating with the antennae of contactless cards.

The purpose of the present invention is to overcome the disadvantages set forth above by proposing a personalization machine ensuring the high speed personalization of chip cards of any type, whether contact, contactless or mixed, without interference and irrespective of the type of programming used for the data to be recorded in the cards.

This purpose is achieved with a High speed machine for personalizing portable objects incorporating an integrated circuit comprising at least one memory, the machine comprising a transfer device for the portable objects to be personalized and a compact rotating drum comprising a plurality of interface electronic circuits, called couplers, for processing data to be recorded in the portable objects, each of these couplers being connected to at least one personalization station comprising at least one linking device communicating with the integrated circuit of a portable object, the personalization stations being successively brought by the rotating drum into loading position, to load a portable object to be personalized arriving from a transfer device, or unloading position to unload a personalized portable object towards the transfer device, characterized firstly in that each of the couplers is removably mounted so that it can be adapted to the type of programming used for the personalization data to be recorded in the portable objects, and secondly in that the personalization stations are also removable for their adaptation to various types of portable objects and/or couplers used for personalizing the portable objects and comprise fixation means cooperating with complementary fixation means present on the rotating drum.

According to another particularity, the linking device of each personalization station communicating with the integrated circuit of a portable object comprises a contact connection head allowing the transmission, by contact, of the data to be recorded in the portable object.

According to another particularity, the linking device of each personalization station communicating with the integrated circuit of a portable object comprises a transmitting and receiving antenna allowing the contactless transmission of the data to be recorded in the portable object.

According to another particularity, the linking device of each personalization station communicating with the integrated circuit of a portable object is mixed, i.e. incorporates a contact connection head and a transmitting and receiving antenna to allow transmission of data to the portable object both with and without contact.

According to another particularity, the fixation means of each personalization station are removable and cooperate with complementary fixation means present on the rotating drum consisting of grooved sections comprising a plurality of grooves enabling the attachment of the personalization stations, each of the personalization stations comprising firstly a fixed bedplate comprising an upper plate intended to be brought into the vicinity of the transfer device to receive a portable object, and secondly a mobile assembly guided in rotation about a rotation axis mounted on the fixed bedplate and on which permanent demand is placed by a presser device in the direction of the fixed bedplate to grip the portable object to be personalized between the mobile assembly and the fixed bedplate.

According to another particularity, each of the personalization stations comprising a fixed bedplate comprising an upper plate intended to be brought into the vicinity of the transfer device to receive a portable object, secondly in that the transmitting and receiving antenna is incorporated underneath the upper plate of the fixed bedplate and comprises inner shielding to limit disturbances in the opposite direction to the plate, and thirdly in that the fixed bedplate underneath the antenna, comprises a ferrite plate and an aluminium plate to prevent any interference between the antennae of the personalization stations.

According to another particularity, the connection head is incorporated in the mobile assembly and comprises a plurality of contact connection pins mounted on elastic means and intended to be placed in contact with the contact pads of a chip of the portable object by rotation of the mobile assembly under the effect of the presser device.

According to another particularity, the rotating drum comprises driving means consisting of a notched belt driven by a motor and cooperating with notches located on the drum to bring each personalization station successively to a loading and/or unloading station (or position) on the transfer device to load the portable objects to be personalized successively brought by the transfer device and to unload personalized portable objects successively evacuated by the transfer device, the transfer device at this loading and/or unloading station comprising an actuating device comprising a rod to raise the mobile assembly with respect to the fixed bedplate during movement of the transfer device, so as to allow unloading of a personalized portable object and loading of a new portable object to be personalized, at least one computer system controlling the sequencing and synchronisation of the actuator device, transfer device, drum motor and the sending of personalization data to the couplers.

According to another particularity, each coupler comprises a microprocessor, which executes a personalization program, and a bus enabling the microprocessor to access the associated personalization stations to control their linking device(s) communicating with the integrated circuit of the portable object, via a connection pad connecting each of the couplers, by at least one flexible connection, to the associated personalization stations.

According to another particularity, the couplers are controlled by at least one computer system and passively transmit, to the personalization stations, data that is generated by this computer system to control the linking device(s) communicating with the integrated circuit of a portable object, via a connection pad connecting each of the couplers, by at least one flexible connection, to the associated personalization stations.

According to another particularity, each coupler is also connected by a connector to a security card for personalization of security functions.

According to another particularity, the rotating drum comprises a mother board consisting of an interconnection interface connecting the couplers in a network and comprising a plurality of interface connectors, called interconnection cards, mounted removably on the motherboard, the latter comprising at least one interface connector connecting it by means of at least one flexible connection to a rotating connector connected to a computer system managing all personalization data and parameters sent to the couplers.

According to another particularity, each interface connector can be adapted to several types of standards for couplers by means of the computer system generating data enabling an addressing circuit of each interface connector to transmit personalization data to the associated coupler.

According to another particularity, each interface connector can be adapted to several types of standards for couplers by means of an integrated logic controlling a bus of the interconnection interface of the mother board to address personalization data to the bus of each of the couplers.

According to another particularity, each coupler comprises routing means and a flexible connection to communicate personalization data to the linking device adapted to the type of portable object with which the personalization station must establish a link.

According to another particularity, the compact rotating drum comprises driving and angle positioning means enabling each personalization station to be stopped at the level of the portable objects successively brought by the transfer device.

According to another particularity, the machine comprises means for commanding the forward movement of the transfer device from one station to another of the machine and for stopping a portable object opposite a personalization station brought into the pathway of the transfer device by the compact rotating drum.

According to another particularity, the machine comprises an unstacking device to unstack portable objects at the entry of the machine, and a stacking device at the exit of the machine.

According to another particularity, the machine comprises a module for the parameter testing of the portable objects, formed by the personalization stations piloted by the couplers under the control of a computer system controlling the execution of at least one functioning test of the portable object.

According to another particularity, the machine comprises an electrical testing station between the compact rotating drum and the unstacking device, and an ejection station before the loading station (or position) onto the personalization drum.

According to another particularity, the machine comprises sequence controlling means for commanding the sequencing and management of personalization, controlling at least the rotation of the rotating drum with respect to the movement of the transfer device, in relation to the data to be recorded in the portable objects.

According to another particularity, the sequence controlling means trigger a substitution sequence when the personalization management means signal a personalization defect on a portable object, at least one personalization station arranged at one position of the drum being held in reserve position and loaded with a reserve portable object, the personalization management means triggering personalization of the portable object from this reserve position when the management means have detected a personalization defect on a so-called <<faulty>> portable object arranged in a personalization station; the sequence controlling means ensuring the unloading of personalized portable objects positioned before the faulty portable object, then the unloading of the faulty portable object and a personalization cycle on the portable object in reserve position that is unloaded at the end of the personalization cycle onto the transfer device, and the loading of a new reserve portable object on this position before the reserve position is resumed, allowing the unloading of the portable object arranged immediately after the faulty portable object.

According to another particularity, the machine comprises a second ejection station at the exit of the drum.

According to another particularity, the second ejection station is activated when a portable object whose personalization is faulty passes in front of this station.

According to another particularity, the rotating drum comprises means for attaching an extension with which to increase the length of the drum when large-size couplers are to be integrated therein.

Figure 2:
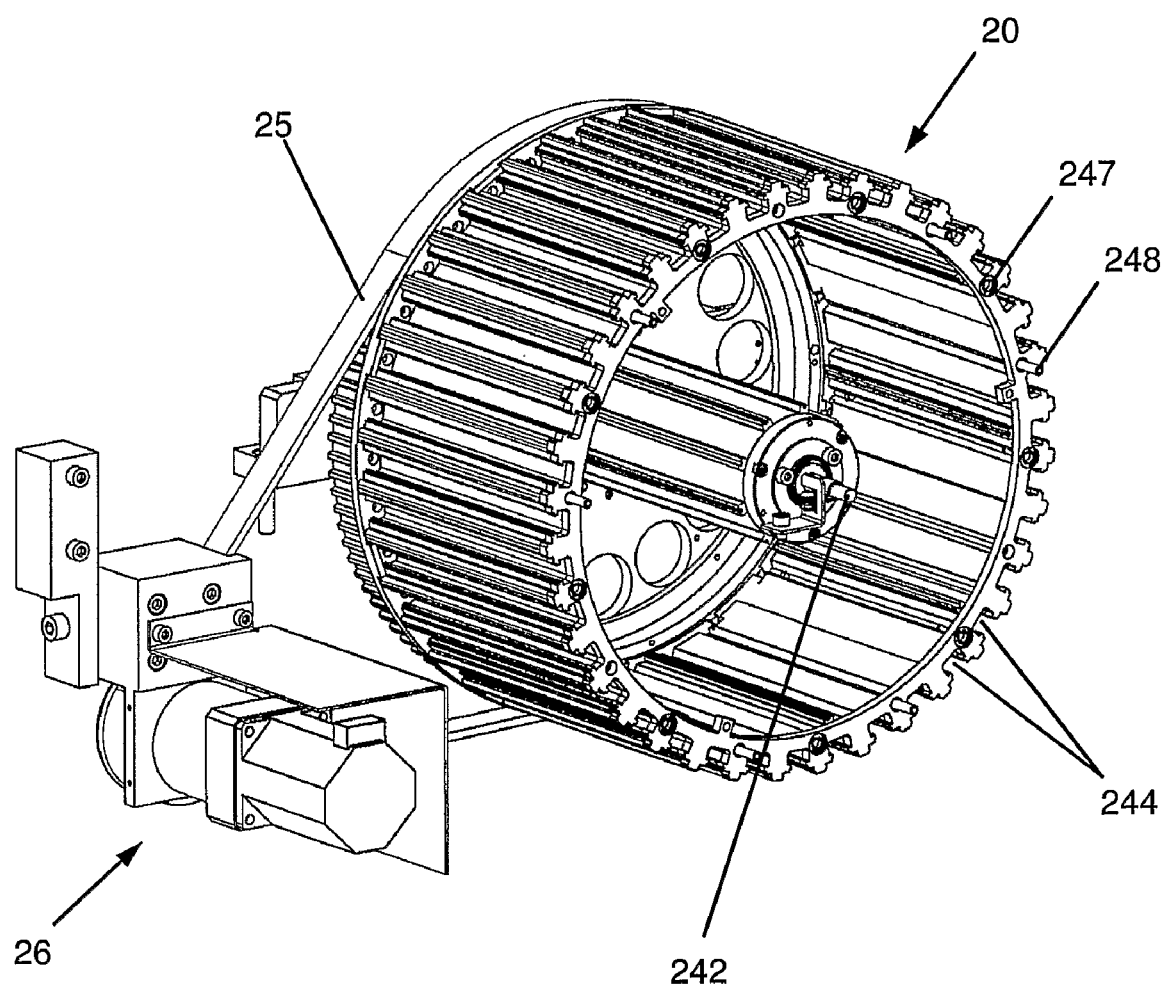
Figure 3A:
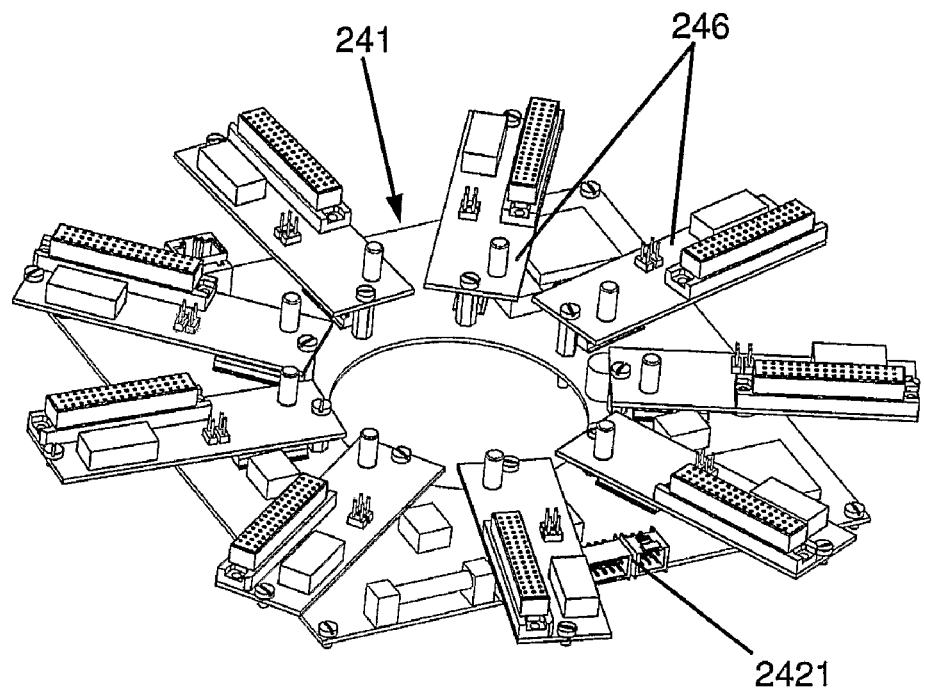
Figure 3B:
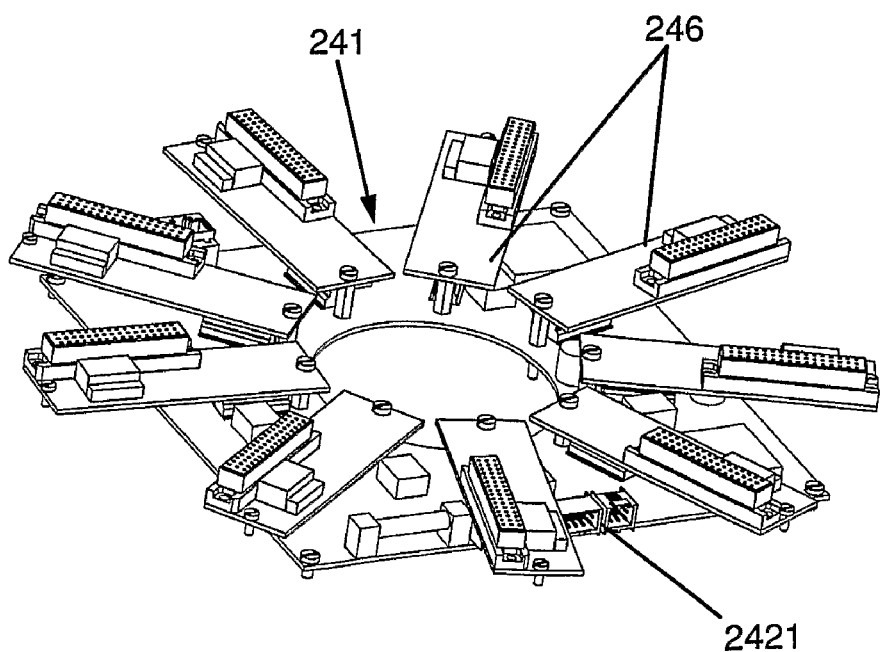
Figure 4:
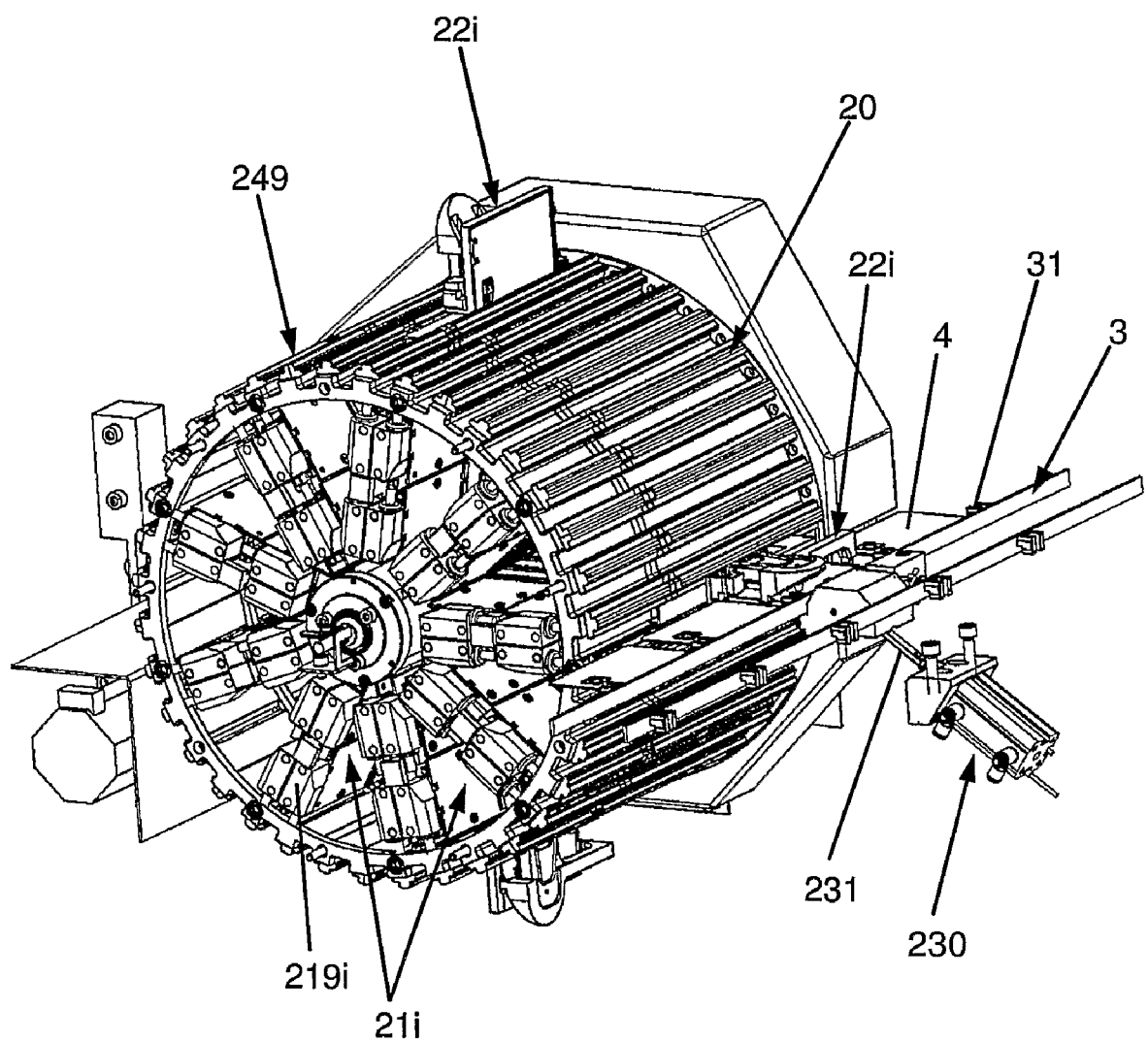
Figure 5A:
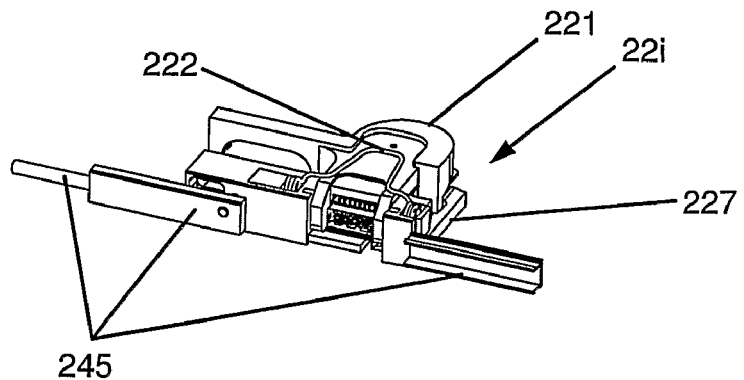
Figure 5B:
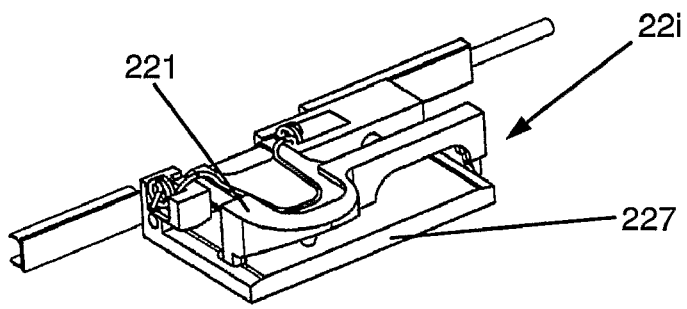
Figure 5C:
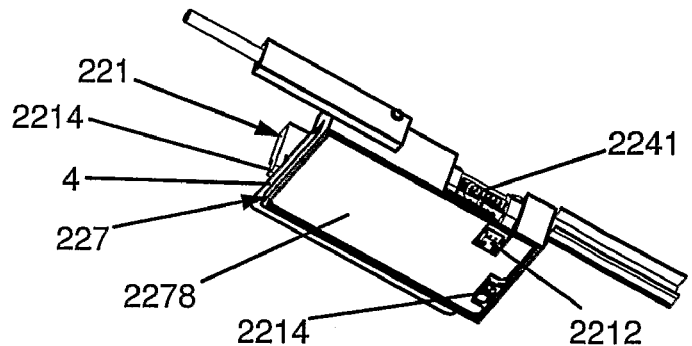
Figure 5D:
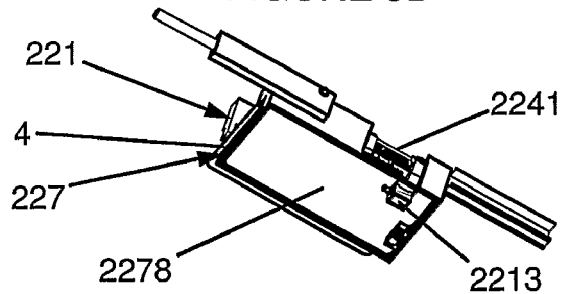
Figure 6A:
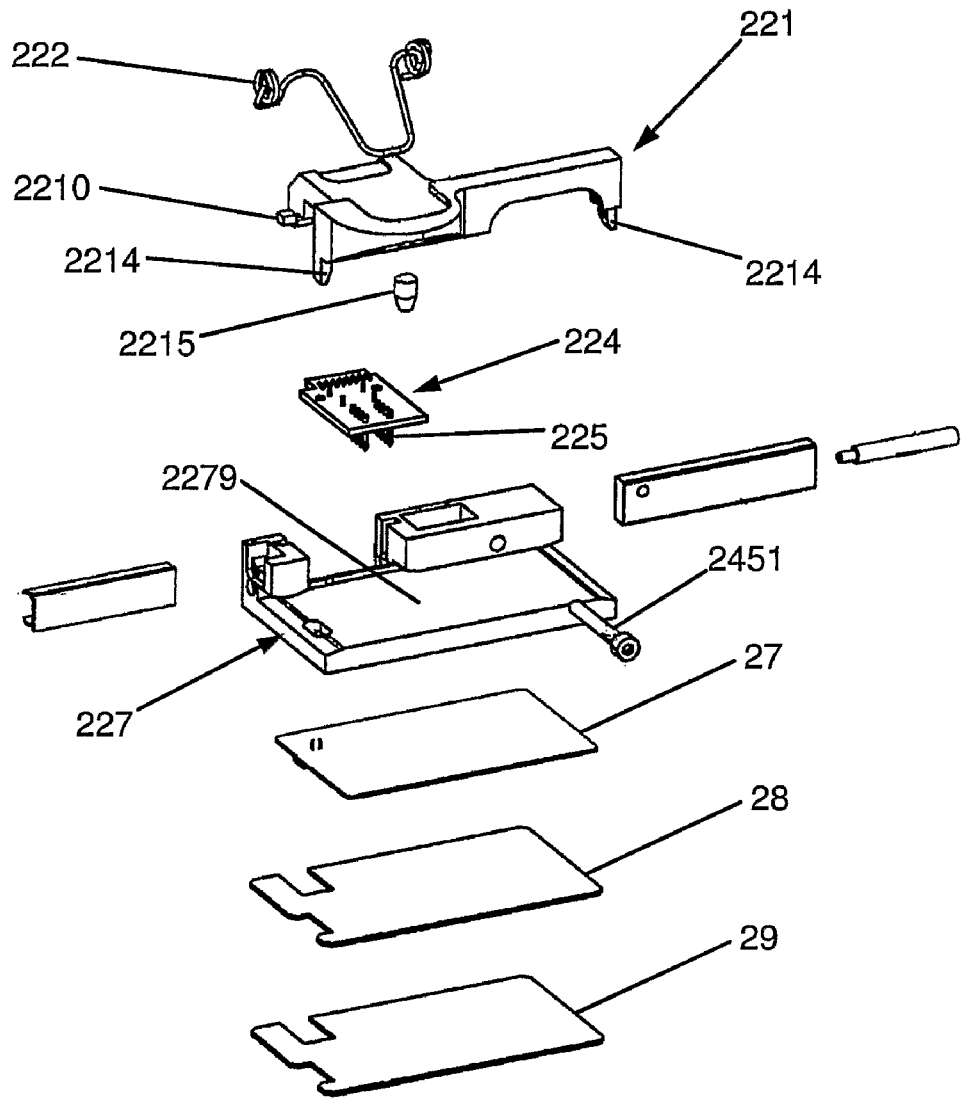
Figure 6B:
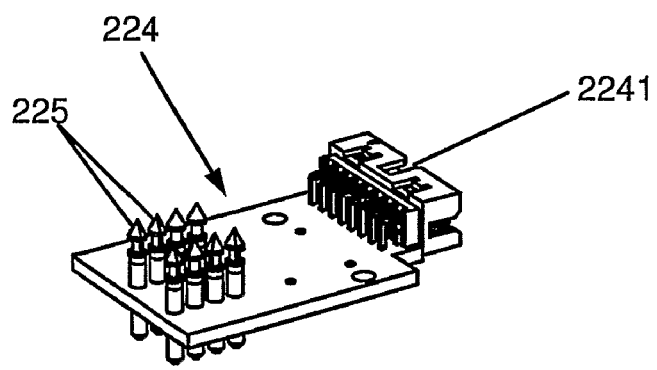
Figure 7A:
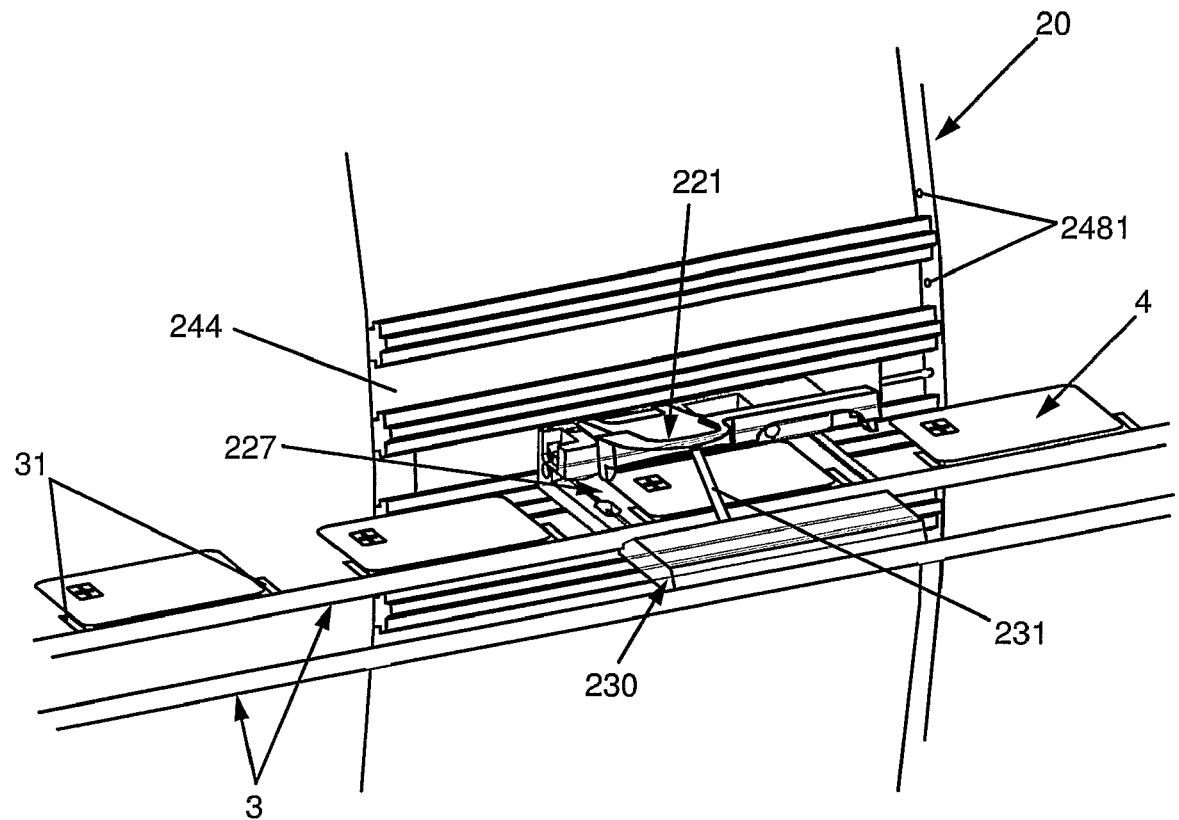
Figure 7B:
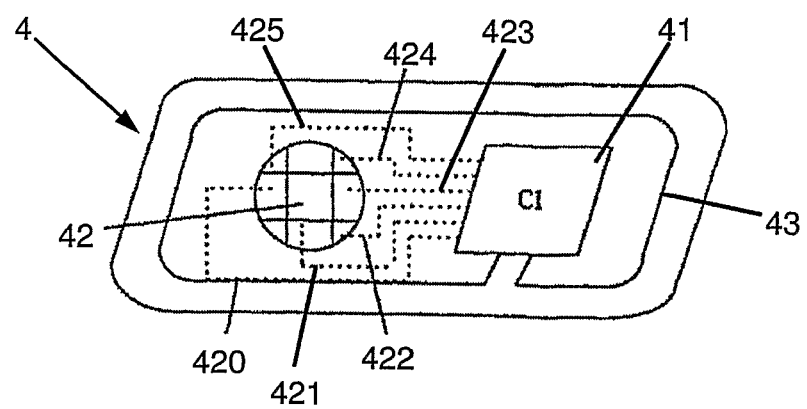

Other particularities and advantages of the present invention will become more apparent on reading the following description given with reference to the appended drawings in which:

FIG. 1 shows a high speed personalization machine according to one embodiment of the invention, FIG. 2 is a perspective view of an embodiment of the rotating drum that is empty but provided with its driving means, FIGS. 3A and 3B are perspective views of two embodiments of the mother board of the rotating drum of the personalization machine, FIG. 4 is a perspective view of an embodiment of the rotating drum provided with couplers and personalization stations, of the personalization machine with part of the transfer device, FIGS. 5A to 5D are perspective views of different embodiments of personalization stations of the machine, FIG. 6A is an exploded view of an embodiment of a personalization station, and FIG. 6B is a perspective view of a contact connection head, FIG. 7A is a perspective view of part of the rotating drum provided with a personalization station positioned at the transfer device of the personalization machine according to one embodiment of the invention, and FIG. 7B is a perspective view of a portable object.

The personalization machine of the present invention is intended to personalize portable objects (4) such as chip cards for example. The portable objects (4) which can be personalized according to the invention can consist of cards (4) equipped with an integrated circuit (41), hereinafter called chip cards, but can also consist of any type of portable object comprising at least one data storage memory and optionally a microprocessor. The portable objects (4) which can be personalized according to the invention may consist of memory cards such as <<Flash>> cards, <<Secure Digital>> cards, <<memory sticks>> etc., but also other storage peripherals such as USB keys or others. The term <<portable object>> therefore designates here any portable electronic object comprising at least one memory in which personalization data can be recorded. The integrated circuit (41) of some chip cards is linked to the outside world by contacts (42) whose contact pads are each connected by a respective conductor (420 to 425) to the inputs of the integrated circuit. The present invention also enables the personalizing of cards (4) whose inputs to the integrated circuit (41) are linked to the outside world by an antenna (43), or mixed cards (4) such as the one shown FIG. 7B comprising both contacts (42) and an antenna (43) to link the inputs of the integrated circuit (41) to the outside world. In different embodiments of the invention the personalization machine may comprise several different modules used to personalize different elements of the portable objects, such as a module for personalizing the support of the portable objects by ink marking or laser marking, and a module for personalizing data recorded in the portable objects. The inventive machine comprises at least one personalization station for chip cards by recording data in a memory of the integrated circuit (41). In one embodiment of the invention, the personalization machine consists of a table (1) mounted on feet (10) on whose top surface is arranged a transfer device (3) formed of a continuous notched belt circulating between two end pulleys of which one is driven by a motor (30).

On this endless belt (3), wedges (31) are mounted at regular intervals, the distance between two consecutive wedges (31) corresponding to the length of a portable object (4), e.g. the size of a credit card hereunder called a chip card. The distance between the wedges (31) may for example be adjusted in relation to the type of portable object to be personalized. Each pair of wedges (31), spaced apart by the length of a chip card, is adjacent to the following pair by a shorter distance. The wedges (31) hold the portable objects (4) in place during the outgoing part of the transfer (from left to right in FIG. 1), when the chip cards are moved from one station to another via the notched belt (3). For more details on the wedges (31) and the transfer device, reference may be made to European patent application 0 589 771 by the same applicant.

The table comprises an unstacking device (11) which, from a batch of stacked cards, distributes the cards and inserts then one by one between each pair of wedges (31). In one embodiment of the invention, the cards so inserted in the transfer device (3) may then be brought to an electric testing station (12) which uses a simple electric test to eliminate faulty or wrong cards. In another embodiment, the machine comprises a parameter testing module for the portable objects, formed by the personalization stations (22i) piloted by the couplers (21i) under the control of a computer system to perform a least one functioning test of the portable object. The couplers (21i) are used to program the portable objects, but can also be used to perform parameter tests on contact or contactless objects to guarantee production quality. These tests may be performed by voltage/current measurements to determine the quality of the connections with the chip, antenna impedance, chip behaviour (with respect to electric disturbances, when signal timings lie outside nominal values) etc. . . . The parameter test can then allow the discarding of chips whose parameters lie outside the values laid down (defined) by constructor specifications, optionally even if they are functional.

The unstacking device (or unstacker) (11) comprises a double input magazine allowing uninterrupted supply to the machine, magazine exchange being conducted during masked time. Each magazine is removable and can contain 500 cards for example. In one embodiment, in which the machine comprises an electric testing station (12), the tested cards (4) can then be transferred to an ejection station (13) which can eject faulty or wrong cards, thereby reducing the number of faulty cards from 4‰ to 2‰ for example. Those cards which successfully pass the optional electric test are then transferred from the ejection station (13) to the specific personalization station of the invention. This personalization station comprises a compact rotating cylinder or drum (20) whose rotation axis is horizontal and parallel to the axis of movement of the transfer device (3) of table (1), so that the drum (20) and the personalization stations (22i) lie perpendicular to the transfer device (3). This rotating drum (20) has fixation means (244) complementary to the fixation means (245) of the personalization stations (22i) and cooperating with these fixation means (245) to allow the mounting, for example removable mounting, of the personalization stations (22i) on the drum. These fixation means (244) of the rotating drum may for example consist of a plurality of grooved sections on the periphery of the drum. In this example, the personalization stations (22i) comprise removable fixation means (245) whose size is adapted for their insertion into the grooves (244) of the drum (20) and enable the removable latching (or attachment) of the personalization stations (22i), so that each personalization station (22i) can be inserted in the pathway of the cards on the transfer device (3). Personalization stations (22i) of different shapes and sizes can therefore be adapted to the rotating drum (20) in relation to the type of portable object (4) to be personalized.

Each personalization station (22i) comprises a fixed bedplate (227) removably mounted on the rotating drum (20) by the removable fixation means (245). This fixed bedplate (227) comprises a surface (2279), for example an upper surface, which can receive the cards (4) to be personalized by inserting itself in the pathway of the transfer device (3). In one embodiment of the invention, the personalization stations (22i) are intended to receive portable objects (4) comprising contacts linking them to the outside world. Some types of portable objects (4) need to be centred with respect to the device with which they are intended to communicate in the personalization machine. Each personalization station (22i) then comprises a mobile assembly (221) comprising guide means (2214), (2215) which, with respect to the surface (2279) of the fixed bedplate (227), can centre the cards (4) successively brought by the transfer device (3) onto the successive personalization stations (22i) of the rotating drum (20). The mobile assembly (221) comprises a rotation axis (2210) mounted on the fixed bedplate (227). The mobile assembly (221) is thereby guided in rotation and a presser device (222), such as a spring for example, places permanent demand upon it in the direction of the fixed bedplate (227) to grip the portable object (4) to be personalized between the mobile assembly (221) and the fixed bedplate (227). As mentioned previously, the inventive personalization machine can be used to personalize the data of portable objects (4) containing either a contact chip (42) or an antenna chip i.e. a so-called contactless chip (43), or one or more chips containing both contacts (42) and an antenna (43). Therefore, different types of personalization stations (22i) can, according to the different embodiments of the invention, comprise either an antenna (27) to communicate with the antennae of the portable objects (4), or a contact connection head (224) to communicate with the contacts (42) of the portable objects, or both an antenna (27) and a contact connection head (224) to communicate with the antennae (27) and contacts (42), respectively, of the portable objects to be personalized. In one embodiment of the invention shown FIG. 6A, the antenna (27) of the personalization stations (22i) is positioned in the fixed bedplate (227) and the contact connection head (224) is positioned in the mobile assembly (221) to enter into contact with the contact pads of the chip card (4) during rotation of the mobile assembly (221) under the effect of the presser device (222). Evidently, the position of the antenna (27) and contact connection head (224) in the personalization stations could be reversed or different from the described position, provided that the antenna (27) lies at a distance allowing it to communicate with the portable object without inducing too much interference on neighbouring stations, as detailed below, and provided that the contact connection heads (224) are positioned so that they allow reliable contact with the contacts of the portable object (4). In other embodiments, the personalization stations (22i) are adapted to the personalization of portable objects (4) whose contacts are not directly accessible via a surface of the object, such as USB keys for example. In these embodiments, the contact connection head (224) could integrate connectors of shape and size adapted to the shape and size of the contact accesses of the portable object (4). In one embodiment with mixed or antenna personalization stations, each fixed bedplate (227), as can be seen more clearly FIG. 6A, comprises a receiving surface (2279) to receive a chip card (4) and under which a transmitting and receiving antenna (27) is located. This receiving surface (2279) consists of a plate in non-conductive material (in plastic material for example) of determined thickness to separate the antenna (27) of the station (22i) over a sufficient distance from the antenna (43) of the card (4), in order to facilitate data exchanges by wireless link between these two antenna, for example by inductive coupling. In one embodiment of the station (22i), the antenna (27) comprises inner shielding to limit electromagnetic disturbances between the antennae (27) of different stations (22i), by preventing the transmission of these disturbances in the opposite direction to the receiving surface, i.e. in the direction of the underside of the fixed bedplate (227). Under the antenna (27) a flexible ferrite plate (28) and an aluminium plate (29) may be added to perfect the shielding. These different elements of the fixed bedplate (227) can be held together by gluing the different layers together. In another embodiment, these different elements may optionally be held in the fixed bedplate (227) by means of a cover in non-conductive material, e.g. a plastic plate fitted into the fixed bedplate (227). This arrangement of the fixed bedplate offers extensive compactness for the personalization station (22i) whilst ensuring good protection against disturbances. Therefore, the rotating drum (20) can be equipped with a large number of personalization stations (22i) whilst remaining compact and with no risk of interference between the antennae (27) of different stations (22i). The stations may therefore optionally lie close to one another and be numerous without requiring a drum (20) of excessive dimensions. In one embodiment of the station (22i), the antenna (27) is electrically linked to a connector (2212) particularly visible in FIG. 5C, which makes it possible to link the antenna (27) via flexible connection (e.g. a wire braid or wire ribbon not shown) to another connector (219i in FIG. 4), located on an electronic personalization card containing interface electronic circuits, hereinafter called a coupler (21i), used to pilot the recording of data in the chip cards (4). In another embodiment of the station (22i), the antenna (27) is electrically linked to a connector (2213), particularly visible in FIG. 5C, which is used to link the antenna (27) via a coaxial cable link (not shown) to the connector (219i) of a coupler (21i). Similarly, in one embodiment of the station (22i), each contact connection head (224) comprises a plurality of contact pins (225) mounted on elastic means and electrically connected to a connector (2241) which ensures the connection with a flexible connection (e.g. a wire braid or ribbon not shown) connected to the connector (219i) of a coupler (21i). With each personalization station (22i) a coupler (21i) is therefore associated arranged in a rack integral with (or joined to) the rotating drum (20). The couplers (21i) are capable of managing several personalization stations (22i) at the same time, making it possible to pilot the recording of data in the chip cards (4) from antennae (27) and/or connection heads (224), and the connectors (219i) of the couplers (21i) make it possible to connect the couplers to the stations (22i) they control. In one embodiment, each coupler (21i) comprises a microprocessor which executes a personalization program loaded in a memory of the coupler (21i). This memory may optionally be integrated in the processor of the coupler (21i) or it may be connected to the processor by a bus (210). The bus (210) enables the microprocessor of each coupler (21i) to access the personalization stations (22i) associated with it, to control their antenna (27) and/or the connection head (224) which form the link devices with the integrated circuit (41) of a portable object (4). The coupler (21i) may comprise an antenna interface circuit arranged between the bus (210) and the connector (219i). In another embodiment, the couplers (21i) are controlled by the computer system and passively transmit data generated by this computer system towards the personalization stations (22i). These passive couplers (21i) therefore allow the computer system to control the link device(s) (224, 27) with the integrated circuit of a portable object (4). In these two embodiments, each of the couplers (21i) is connected by at least one flexible connection to the associated personalization stations (22i), via a connection pad (219i). In another embodiment, the couplers (21i) can be connected to a security chip card whose function is to provide security data required for personalizing security applications.

The rotating drum (20) comprises a mother board (241) consisting of an interconnection interface for network linking of the couplers (21i). This interconnection interface of the motherboard (241) comprises a plurality of interface connectors (246), called interconnection cards, removably mounted on the mother board (241) and on which several types of standards for couplers (21i) can be adapted. The mother board (241) comprises at least one interface connector (2421) connecting it by at least one flexible connection to a rotating connector (242) connected to the computer system managing all the personalization data and parameters sent to the couplers (21i). In one embodiment, each interface connector (246) can be adapted to several types of standards for couplers (21i) by means of the computer system which manages the data allowing an addressing circuit of each interface connector (246) to transmit the personalization data towards the associated coupler (21i). In another embodiment, each interface connector (246) can be adapted to several standards for couplers (21i) by means of an integrated logic controlling a bus of the interconnection interface of the mother board (241) to address personalization data to the bus (210) of each of the couplers (21i). In the embodiments shown FIGS. 1 to 7, the drum (20) comprises a mother board (241) having 9 interface connectors (246) on which 9 couplers (21i) can be connected. Each of the couplers (21i), according to the standard used, can manage for example 2 linking devices by antenna (27) and 2 linking devices by contacts (224), or 4 linking devices by contacts (224). The rotating drum (20) can therefore, in this embodiment given as a non-limiting example, comprise 36 personalization stations (22i) making it possible to personalize the data of 35 or 36 chip cards (4) at the same time. The rotating drum (20) comprises driving means consisting of a notched belt (25) driven by a motor (26) and cooperating with notches located on part of the periphery of the drum, to bring each personalization station (22i) successively to a loading and/or unloading station (or position) on the transfer device (3) to load the portable objects (4) to be personalized, successively brought by the transfer device (3), and to unload the personalized portable objects (4) successively evacuated by the transfer device (3). The transfer device (3), at this loading and/or unloading station (or position), comprises an actuating device (230) comprising a rod (231) which raises the mobile assembly (221) with respect to the fixed bedplate (227) during the movement of the transfer device (3) so as to allow unloading of a personalized portable object (4) and loading of a new portable object (4) to be personalized. In order to manage personalization, at least one computer system is connected to the different elements of the inventive machine to control the sequencing and synchronisation of the actuating device (230), the transfer device (3), the motor (26) of the drum and the sending of personalization data to the couplers (21i). Hence, the personalization of chip cards (4) loaded on the drum (20) takes place during the loading of the following chip cards (4) to be personalized and the unloading of the previous chip cards already personalized. The personalized cards or cards leaving the drum are conveyed by the transfer device (3) towards an ejection station (14). This ejection station (14) is used to eliminate cards whose personalization is incomplete or which are faulty. If personalization has been successful, the card is transferred to an optional upturning station (15) so that it can be marked on the reverse side by a marking machine (16). According to different non-specific embodiments of the invention, this marking station (16) can conduct laser or ink marking and the upturning (or overturning) station (15) can be an integral part of this marking station (16). Finally, the card is conveyed to a conventional stacking device (17) where it is stacked in a double magazine functioning along the same principle as the unstacking device (11) but in reverse.

The rotating drum (20) can therefore comprise a large number of personalization stations (22i) each associated with a coupler (21i) which manages the personalization of the chip card 4 inserted by the transfer belt (3) into the personalization station (22i) to which the coupler (21i) is connected. The invention forecasts (provides for) different types of personalization stations (22i) adapted to the different types of portable objects to be personalized and to the different types of couplers (21i). Similarly, the couplers (21i) are designed to pilot the different types of personalization stations (22i) and to allow the personalization of different types of portable objects (4). In one variant of embodiment, the invention provides for different types of couplers (21i) each adapted to at least one type of personalization station (22i) and/or portable object (4). Each coupler is connected to at least one personalization computer system which, as mentioned previously, can manage the functioning of the different elements of the machine. The connection between the couplers (21i) rotatably arranged on the drum and the fixed installation of the remainder of the machine (the computer system in particular) is ensured by a rotating collector (242). The connection is ensured by fixed contacts joined to the fixed part of the machine and bearing on a set of rotating tracks joined to (or integral with) the rotating drum (20). Similarly, the powering required for the material on board the rotating drum is supplied via fixed contacts bearing on power tracks in the rotating collector (242). The computer system comprises management software to manage card personalizing and also to manage the marking, stacking, unstacking stations etc.

The computer system manages the sequential commanding of the machine and receives data from different positioning devices such as an angle position encoder for the drum (20) enabling the system to track the position of the different personalization stations (22i), or a card position detector at the loading and/or unloading station (or position) of the drum. The positions of the personalization stations (22i) can be followed by an encoding system, not shown. The different detection devices for the different elements of the machine are used to ensure that a card (4) conveyed by the transfer device (3) is positioned opposite the proper station. In addition, these detection devices, associated with the computer system managing the sequential commanding of the machine and hence personalization sequencing by the drum (20), enable the computer system to manage all kinds of complex personalization sequences, for example sequences requiring rotations of the drum (20) in steps (or pitches) of two personalization stations (22i) at once, or personalization sequences requiring two rotations of the drum, for example to personalize portable objects via contactless link during a first rotation and via a contact link during a second rotation.

When in operation, the belt transfer device (3) removes a card (4) whose personalization is completed from the rotating drum (20) and inserts a new chip card in the personalization station (22i) whose position has just been freed. After inserting the card, the drum (20) is rotated of a given position. Personalization lasts a minimum time, which can correspond for example to the rotating time for a complete rotation. After a sufficient number of fractions of rotation of the drum (20), the personalized card is repositioned at the loading and/or unloading station (or position) in the transfer pathway between two free wedges (31) of the transfer device (3). Then this card is removed from the personalization station (22i) by movement of the transfer belt (3) after the mobile assembly (221) is raised. The personalization program knows the types of cards and, in its algorithm, contains the necessary instructions to address, via the bus (210) of each coupler (21*i*), the respective connector (219*i*) which corresponds to the type of card, whether contact or contactless, present in the personalization station to which the personalization data are addressed via the coupler (21*i*). If the cards are <<mixed>> cards, the personalization program will give access to the card (4) via the contact connection head (224) for the personalization of certain so-called <<non-security>> parts and will access the card (4) via antenna (27) for example to transmit security data. This security data will be taken from a security card when personalizing so-called "security" functions or applications. Hence the personalization program will comprise the means to selectively address and selectively command the addressing of data to either one of the linking devices.

During production, it is generally known which type of cards are to be personalized and only one type of card is personalized at the same time. However, it is possible according to the invention to make provision for another embodiment which could consist of an electronic routing device controlled by information given by the personalization program, making it possible to know which type of card is concerned, contactless or contact or mixed and, in relation to the personalization operation in progress, to validate transmission of data to the cards via the access of the bus (210) of each coupler (21*i*) to one of the linking devices (27, 224) for example.

Another embodiment of the invention may consist of making provision in the personalization program for means to determine the card type when a card is presented in front of the personalization station (22*i*) associated with the coupler (21*i*). These means could in this case form a procedure consisting of sending a message to the contact device and after a certain time delay to ascertain whether the card has sent a reply. If no reply is received, it is inferred that the card is of "contactless" type. The program sends information to the transmitting antenna (27) and after a certain time lapse reads the reply, if any, transmitted by the card. If there is a reply, the program knows that there is a contactless card to be personalized. If there is no reply, the device considers that no card is present. If the contact link device (224) retransmits a reply from the chip card to the personalization station (22*i*), the program nevertheless continues with a message sending step to the transmitting antenna (27) to determine whether the card is of "mixed" type. If the reply is negative for this latter test, the program considers that the card is of <<contact card>> type.

The fact that each coupler (21*i*) is on board the rotating drum (20) makes it possible to personalize cards (4) much more rapidly by shortening the transmission times between the personalization equipment and the chip cards (4) to be personalized. Similarly, the fact that only personalization parameters need to be transmitted, and that each coupler (21*i*) has a microprocessor with an on-board personalization program, or that the computer system generates data arranged for passive transmission by the couplers (21*i*) also improves the yield of the machine. In addition, the use of a security card delivering security data required for security personalization operations improves the reliability and security of personalization operations. Finally, the compactness allowed by the fact that the personalization stations (22*i*) are protected against interferences between their respective antennae (27) makes it possible to increase the rate of personalization by multiplying the stations (22*i*) whose number on the drum (20) can be modulated, and the use of a mother board (241) having interconnections adaptable to standards of couplers (21*i*) imparts an additional modularity to the personalization machine according to the present invention. Some couplers (21*i*) are of greater size than others and the possibility of adding an extension (249) which can be fixed onto the drum by removable fixation means (247, 248) to extend the length of the drum (i.e. the height of the cylinder) further reinforce this modular advantage and the adaptability of the inventive machine.

It will be obvious for those skilled in the art that the present invention allows embodiments in numerous other specific forms without departing from the scope of application of the invention as claimed. Therefore the above embodiments are to be considered illustrative but can be modified in the sphere defined by the scope of the appended claims, and the invention is not to be limited to the details given above.

The invention claimed is:

1. High speed machine for personalizing portable objects incorporating an integrated circuit having at least one memory, the machine comprising:
a transfer device for the portable objects to be personalized and a rotating drum including a plurality of interface couplers for processing data to be recorded in the portable objects, each of the couplers being connected to at least one personalization station including at least one linking device communicating with the integrated circuit of a portable object, each of the personalization stations being brought by the rotating drum into a loading position to load a portable object to be personalized arriving from a transfer device; or brought to an unloading position to unload a personalized portable object towards the transfer device; each of the couplers is removably mounted so that it can be adapted to the type of programming used for the personalization data to be recorded in the portable objects, and the personalization stations are also removably mounted for their adaptation to various types of portable objects and/or couplers used for personalizing the portable objects, and each of the personalization stations includes fixation structure cooperating with complementary fixation structure present on the rotating drum.

2. Machine according to claim 1, wherein the linking device of each personalization station comprises a contact connection head allowing the transmission, by contact, of the data to be recorded in the portable object.

3. Machine according to claim 1, wherein the linking device of each personalization station comprises a transmitting and receiving antenna allowing the contactless transmission of the data to be recorded in the portable object.

4. Machine according to claim 1, wherein the linking device of each personalization station is a mixed, device that incorporates a contact connection head and a transmitting and receiving antenna to allow transmission of data to the portable object both with and without contact.

5. Machine according to claim 2, wherein the fixation structure on the rotating drum comprises grooved sections including a plurality of grooves enabling the attachment of the personalization stations, each of the personalization stations including a fixed bedplate having an upper plate intended to be brought into the vicinity of the transfer device to receive a portable object, and a mobile assembly guided in rotation about a rotation axis mounted on the fixed bedplate and on which permanent demand is placed by a presser device in the direction of the fixed bedplate to grip the portable object to be personalized between the mobile assembly and the fixed bedplate.

6. Machine according to claim 5, wherein the connection head is incorporated in the mobile assembly and the connection head comprises a plurality of contact connection pins mounted on elastic means and intended to be placed in contact with the contact pads of a chip of the portable object by rotation of the mobile assembly under the effect of the presser device.

7. Machine according to claim 5, wherein the rotating drum comprises a driving mechanism that includes a notched belt driven by a motor and cooperating with notches located on the drum to bring each personalization station to the loading or unloading position the transfer device comprises an actuating device that includes a rod to raise the mobile assembly with respect to the fixed bedplate during movement of the transfer device, so as to allow unloading of a personalized portable object and loading of a new portable object to be personalized, at least one computer system controlling the sequencing and synchronisation of the actuating device, transfer device, drum motor and the sending of personalization data to the couplers.

8. Machine according to claim 1, wherein each coupler is also connected by a connector to a security card for personalization of security functions.

9. Machine according to claim 3, wherein each of the personalization stations comprises a fixed bedplate having an upper plate intended to be brought into the vicinity of the transfer device to receive a portable object, and the transmitting and receiving antenna is incorporated underneath the upper plate of the fixed bedplate and the transmitting and receiving antenna includes inner shielding to limit disturbances in the opposite direction to the upper plate, and the fixed bedplate underneath the antenna comprises a ferrite plate and an aluminium plate to prevent interference between the antennae of the personalization stations.

10. Machine according to claim 1, wherein each coupler comprises a microprocessor, which executes a personalization program, and a bus enabling the microprocessor to access the associated personalization stations to control their linking device communicating with the integrated circuit of the portable object, via a connection pad connecting each of the couplers, by at least one flexible connection, to the associated personalization stations.

11. Machine according to claim 1, wherein the couplers are controlled by at least one computer system and passively transmit to the personalization stations data that is generated by the computer system to control the linking device communicating with the integrated circuit of a portable object, via a connection pad connecting each of the couplers, by at least one flexible connection, to the associated personalization stations.

12. Machine according to claim 1, wherein the rotating drum comprises a motherboard that includes an interconnection interface connecting the couplers in a network and a plurality of interface connectors mounted removably on the motherboard, at least one flexible connection connecting at least one of the interface connectors to a rotating connector connected to a computer system managing all personalization data and parameters sent to the couplers.

13. Machine according to claim 12, wherein each interface connector can be adapted to several types of standards for couplers by the computer system generating data enabling an addressing circuit of each interface connector to transmit personalization data to the associated coupler.

14. Machine according to claim 12, wherein each interface connector can be adapted to several types of standards for couplers by an integrated logic controlling a bus of the interconnection interface of the motherboard to address personalization data to the bus of each of the couplers.

15. Machine according to claim 1, wherein each coupler comprises a routing mechanism and a flexible connection to communicate personalization data to the linking device.

16. Machine according to claim 1, wherein the rotating drum comprises driving and angle positioning means enabling each personalization station to be stopped at the level of the portable objects brought by the transfer device.

17. Machine according to claim 1, further comprising a mechanism that commands forward movement of the transfer device from one station to another of the machine and that stops a portable object opposite a personalization station brought into the pathway of the transfer device by the rotating drum.

18. Machine according to claim 1, further comprising an unstacking device to unstack portable objects at an entry of the machine, and a stacking device at an exit of the machine.

19. Machine according to claim 1, further comprising a testing module adapted to parameter test the portable objects, formed by the personalization stations piloted by the couplers under the control of a computer system controlling the execution of at least one functioning test of the portable object.

20. Machine according to claim 18, further comprising an electrical testing station between the rotating drum and the unstacking device, and an ejection station before the rotating drum.

21. Machine according to claim 20, further comprising a sequence controller that commands the sequencing and management of personalization, and controls at least the rotation of the rotating drum with respect to movement of the transfer device, in relation to the data to be recorded in the portable objects.

22. Machine according to claim 21, wherein the sequence controller triggers a substitution sequence when a personalization manager signals a personalization defect on a portable object, at least one personalization station being held in reserve position and loaded with a reserve portable object, the personalization manager triggering personalization of the portable object from the reserve position when the personalization manager detects a personalization defect on a faulty portable object arranged in a personalization station; the sequence controller ensuring the unloading of personalized portable objects positioned before the faulty portable object, then the unloading of the faulty portable object and a personalization cycle on the portable object in reserve position that is unloaded at the end of the personalization cycle onto the transfer device, and the loading of a new reserve portable object in the reserve position allowing the unloading of the portable object arranged immediately after the faulty portable object.

23. Machine according to claim 22, wherein the machine comprises a second ejection station at an exit of the drum.

24. Machine according to claim 23, wherein the second ejection station is activated when a portable object whose personalization is faulty passes in front of the second ejection station.

25. Machine according to claim 1, wherein the rotating drum comprises an attachment mechanism to attach an extension with which to increase the length of the drum when large-size couplers are to be integrated therein.

* * * * *